April 22, 1969 G. BOGNER 3,440,336

WEB-SHAPED SUPERCONDUCTOR

Filed Oct. 14, 1966

United States Patent Office 3,440,336
Patented Apr. 22, 1969

3,440,336

WEB-SHAPED SUPERCONDUCTOR

Gunther Bogner, Erlangen, Germany, assignor to Siemens Aktiengesellschaft, a corporation of Germany Filed Oct. 14, 1966, Ser. No. 586,712
Claims priority, application Germany, Oct. 16, 1966, S 100,093
Int. Cl. H01b *5/08, 5/02, 11/02*
U.S. Cl. 174—128 5 Claims

ABSTRACT OF THE DISCLOSURE

Web-shaped superconductor has a plurality of hard web-shaped superconductive individual conductors, a coating of metal having good heat and normal electrical conductivity surrounding the conductors respectively, the metal-coated conductors being mutually superimposed so that the coatings of mutually adjacent conductors are in relatively good electrical and heat transfer contact with one another, the metal coatings at least at mutually adjacent contact surfaces thereof having a thin layer of metal of high purity and low melting point, of good heat conductivity and, during operation of the superconductor, of good normal electrical conductivity by which the conductors are soldered to one another.

Figure 1:
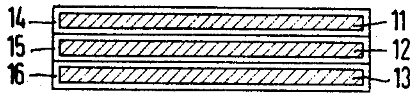

My invention relates to web-shaped or ribbon-shaped superconductors.

Wire or web-shaped high-intensity field superconductors used particularly in the construction of superconductive magnetic coils and consisting for example of the hard superconductive intermetallic alloys niobium-zirconium and niobium-titanium or of the hard superconductive intermetallic compound niobium-tin, exhibit electrical instabilities which are attributable to magnetic flow discontinuities and can cause local brief transitions of the superconductor from superconductive to normally conductive state. With larger magnets, these instabilities lead to a great degradation of current, that is, the superconductors of the magnetic coils transform to the normally conductive state even with a substantially smaller current density then short samples of the same material in the same magnetic field. This current degradation requires utilization of an increased amount of material for producing a specific magnetic field. By coating the superconductor with a good electrically normal-conductive and good heat-conductive metal layer, the degradation effect can be reduced. Furthermore, by connecting several superconductors in parallel, which can be effected by means of the layers of more common metals of good normal conductivity superimposed thereon, a multiple conductor can be obtained, so that any single conductor that becomes briefly unstable can be relieved of its load because the other single conductors of the parallel conductor can distribute the load between themselves. A multiple conductor of this type consequently remains superconductive in spite of the instabilities in the individual conductors during current flow. A magnetic coil with a winding formed of multiple conductors therefore transforms to the normal conductive state at higher current densities more readily than magnetic coils whose winding consists of individual conductors.

Parallel connection of individual conductors to form multiple conductors has already been known for superconductive wires. In the production of coils having windings of wires consisting of the superconductive alloys niobium-zirconium and niobium-titanium, the copper-clad individual conductors formed of these alloys, preferably with the addition of copper wires, are twisted to provide cables (Review of Scientific Instruments 36, 1965, pages 825 to 830).

It is not possible, however, to collect individual conductors into a multiple conductor by twisting, when the individual conductors are band or web-shaped superconductors. Nevertheless, an increasing interest is found among the experts in the art for employing superconductive webs or ribbons, instead of superconductive wires, for the windings of superconductive coils. A particularly interesting superconductor having layers of intermetallic superconductive compounds, especially layers of niobium-tin ($Nb_3Sn$) exhibiting excellent superconductive qualities, has heretofore been made largely in web form. For prime stabilization, these webs are for the most part coated with metal layers of good conductivity, for example copper or silver. Also, when using superconductive alloys, web-shaped superconductors have been found to be desirable because of the advantageous packing factor achievable when winding coils. It is, however, very difficult to connect such web-shaped superconductors in parallel to form a multiple conductor in order to improve the electrical stability of the superconductor, because the techniques employed in cable-making which are used to form wire-shaped superconductors are not employable for forming web-shaped superconductors.

It is accordingly an object of my invention to provide a web-shaped superconductor of the multiple conductor type wherein individual conductors are connected in parallel without having to resort to cable-making techniques.

With the foregoing and other objects in view, I provide in accordance with my invention a web-shaped superconductor comprising a plurality of web-shaped hard superconductive individual conductors that are respectively surrounded by a coating of metal of good normal electrical conductivity and heat conductivity at the operating temperature of the superconductor. The metal-coated individual conductors are superimposed upon one another in the form of a sandwich so that the coatings of the mutually adjacent individual conductors are in good electrical and heat transfer contact with one another.

In accordance with other features of my invention, the superconductive individual conductors are formed of webs or ribbons of hard superconductive intermetallic alloys, such as niobium-zirconium and niobium-titanium especially. Other suitable webs or ribbons are provided with thin layers of hard superconductive intermetallic compounds, consisting especially of niobium-tin. The niobium-tin layers in the last-mentioned webs or ribbons are located for the most part on the surface of a suitable carrier or in the interior of a web or ribbon otherwise consisting essentially of niobium.

In spite of the brittleness of niobium-tin, thin layers thereof are workable relatively well. Copper, aluminum, gold and silver are particularly suitable as coating metals for the web-shaped or band-shaped individual conductors. At the operating temperature of the superconductor which is generally about 4.2° Kelvin, these metals have good electrical normal conductivity and good heat conductivity. They can, for example, be deposited electrolytically on the superconductive individual conductors or applied especially by rolling in the case of the superconductive alloys.

Due to the good electrical contact of the normal-conductive metallic coatings of the superimposed individual conductors in the web-shaped superconductor constructed in accordance with my invention, when a superconductive individual conductor is partially transformed to the normal-conductive state before the critical current of a suitable short test is reached, the current flowing through this conductor can be transferred through the coatings of good electrical conductivity to other superconductive individual conductors. The individual conductor partially transformed to the normal-conductive state thereby becomes relieved of its load and is again transformed to the superconductive condition. The extension or spread of the normal-conductive region over the entire conductor cross section and subsequently over the entire coil is thereby prevented. Moreover, due to the metallic coatings which are in good heat contact with one another, excellent cooling of the web-shaped superconductor is effected.

The web-shaped superconductor of my invention can be formed further in various ways in accordance with other features of my invention. Also there are various methods for achieving a strong bonding and an intimate contact between the sandwich-like superimposed individual conductors. The surfaces of the electrically normal-conductive casings of the superconductive individual conductors are advantageously well polished in order to achieve a good electrical contact and a good heat contact between the individual conductors. When the individual conductors are coated sandwich-like on one another and rolled, these well-polished surfaces are bonded to one another. In many cases this mechanical bonding of the superconductive webs according to my invention is adequate. Since the layers of superconductive intermetallic compounds are not insensitive to roller pressure, this method is suitable advantageously for web-shaped superconductors of superconductive alloys, for example for superconductors of niobium-zirconium which are provided with an aluminum coating.

To improve the electrical and heat contact between the web-shaped individual conductors, the coatings of the individual conductors according to a further feature of my invention are provided at least at the contact surfaces with a thin layer of a good heat conductive metal of high purity and low melting point which has a good electrical normal conductivity during operation of the superconductor. Indium has been found to be particularly suitable, having a melting point of approximately 150° C. With indium of a purity of at least 99.999 percentage by weight, the electric residual resistance of these thin layers is especially low at low temperatures. The thickness of the layers is advantageously in the order of magnitude of substantially $10^{-3}$ mm.

The sandwich-like superimposed web-shaped individual conductors of the superconductor of my invention can furthermore be soldered to one another by means of the thin layers of the metal with low melting point. The metal layers serve, in this form of the superconductor of my invention, both for achieving a good contact between the coatings of the individual conductors and for mechanically bonding the superconductor. For the purpose of soldering, the sandwich-like superimposed individual conductors provided with a thin layer of indium can for example be permitted to pass over Teflon rollers heated up to about 200° C. While soldering with indium, the web-shaped superconductor can be produced also directly when winding of the coil for which it is to be used, either together with the winding operation or after the winding operation has been carried out. Thereby, a winding layer of several sandwich-like superimposed individual webs provided with a thin indium layer is produced and the webs are baked together with the aid of the pressure and heat produced by the winding operation.

To improve the cooling and to further electrically stabilize the web-shaped superconductor according to my invention, it is also advantageous to provide the superimposed individual conductors, that is the entire web-shaped superconductor, with a common casing of good heat-conductive metal, which has a good electrical normal conductivity during operation of the superconductor. The metals, copper, silver, gold and aluminum are particularly suitable as coating materials. The casing can be formed for example on the web-shaped superconductor by electrolytic deposition. Furthermore, it is possible to wind up the web-shaped superconductor, for example, with a copper band or web. This has the advantage that the metallic casing thus formed is especially elastic. The copper band or web employed for encasing the superconductor can, if desired, be coated with indium. By means of this indium coating, the overlapping portions of the copper band or web can be soldered to one another by heating after the coil has been wound, and the casing thus formed can be brought into good electrical and heat-conductive contact with the conductor.

The web-shaped superconductor according to my invention furthermore can be provided with an electrically insulating casing. This casing consists of a low-temperature resistant insulating material, for example polyethyleneterephthalate. Coils with windings of such electrically insulated conductors can be energized especially rapidly. Furthermore, they can withstand relatively large voltages within a winding.

The casing or normal-conductive metals and/or insulating materials also serve to mechanically hold together well the web-shaped individual conductors forming the superconductor according to my invention.

To achieve a particularly good electrical stability for web-shaped superconductors according to my invention, there can furthermore be provided between the separate web-shaped individual conductors and/or on both of the outer web-shaped individual conductors, web-shaped foils of good heat-conductive metal which have a good electrical normal conductivity during operation of the superconductor. The metals, copper, aluminum, silver and gold are also especially suitable for these foils. The foils and individual conductors can, for example, be secured to one another by rolling. With the aid of the foils of normal conductive metal and of the coating of normal conductive metal surrounding the entire superconductor, if desired, upon the transformation of the web-shaped individual conductors into the electrically normal-conductive state, the entire current flowing through the web-shaped superconductor can be absorbed from the stored or surrounding normal-conductive metals, and accordingly the conductor will not be heated above the critical temperature for the available magnetic field. A combination of superconductive and cryomagetic coils is obtained therewith. By means of a slight reduction of the coil current, the superconductor can again be transformed to the superconductive state. A breakdown of the magnetic field energy of the coil is thereby prevented.

The layers of normal conductive metal inserted between the superconductive layers of the superconductor constructed in accordance with my invention furthermore permit excellent cooling of the superconductor and afford additional heat capacity against overheating.

Other features which are considered as characteristic for the invention are set forth in the appended claims.

Although the invention is illustrated and described herein as embodied in web-shaped superconductors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 1 to 5 are schematic and enlarged cross-sectional views of various embodiments of the web-shaped superconductor constructed in accordance with my invention.

Referring now to the drawings and first particularly to FIG. 1 thereof there is shown a web-shaped superconductor according to my invention formed of three webs 11, 12 and 13, consisting of a superconductive intermetallic alloy such as niobium-zirconium, for example, that are coated with layers 14, 15 and 16 of a metal having good electrical normal conductivity and good heat conductivity such as copper, for example. The three coated webs 11, 12 and 13 are mutually superimposed like a sandwich. The web-shaped individual conductors are held together by the good cohesion of the polished surfaces of the coatings.

Figure 2:
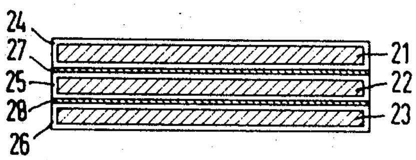

In FIG. 2 there is shown a web-shaped superconductor formed of three sandwich-like, superimposed web-shaped individual conductors 21, 22 and 23 consisting for example of niobium-titanium. The individual conductors are coated with layers 24, 25 and 26 of a normal-conductive metal such as copper, for example. At the contact surfaces, the coatings are respectively provided with a thin layer of indium. Thus, there is formed between the web-shaped individual conductors, thin layers 27 and 28 of indium by means of which the individual conductors are able to be soldered to one another.

Figure 3:
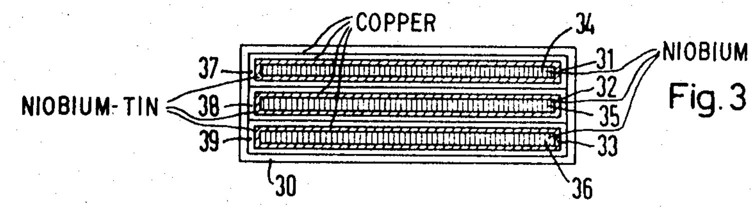

FIG. 3 shows a web-shaped superconductor according to my invention which is formed of individual conductors having surface coatings of niobium-tin. The niobium-tin layers 31, 32 and 33 are applied to the metallic carriers 34, 35 and 36, respectively. The individual conductors are provided with copper coatings 37, 38 and 39, respectively. A copper casing 30 surrounds the sandwich-like, mutually superimposed individual conductors.

Figure 4:
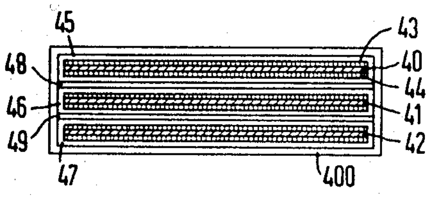

The web-shaped superconductor according to my invention which is shown in FIG. 4 is formed of three web-shaped individual conductors whose interior consists of thin niobium-tin layers 40, 41 and 42. The remaining portions 43 and 44 of such a web-shaped individual conductor consist of niobium. The individual conductors are surrounded with copper casings 45, 46 and 47, respectively. Between the individual conductors there are furthermore disposed copper foils 48 and 49. A copper coating 400 surrounds the entire web-shaped superconductor.

Figure 5:
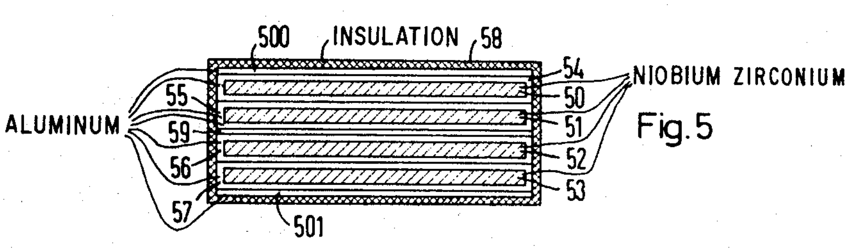

FIG. 5 shows a web-shaped superconductor according to my invention which is formed of four niobium-zirconium conductors 50, 51, 52 and 53. The individual conductors are coated with aluminum layers 54, 55, 56 and 57, respectively. An insulating casing 58 surrounds the entire superconductor. Between the individual conductors 51 and 52 as well as on the outer individual conductors 50 and 53, there are provided web-shaped aluminum foils 59, 500 and 501.

The layers having good electrical and heat conductivity and the insulating layers as well as the metal foils and layers of indium between the separate web-shaped individual conductors can be combined with one another in various ways other than as shown by the embodiments of the figures.

The number of web-shaped individual conductors from which the web-shaped superconductors according to my invention is formed, and the total thickness of the web-shaped superconductor can be determined or limited by the mechanical load capacity or power rating of the webs and the radius of curvature of the coil winding which is to be formed with the web-shaped superconductor. As an example, for a radius of curvature of 5 cm., a web-shaped superconductor according to my invention can be formed of about three to five individual webs with niobium-tin layers, each of the individual webs being approximately 80 to 90 microns ($\mu$) thick. The total thickness of the web-shaped superconductor enclosed within the casing is about 0.5 millimeter. Such a web-shaped superconductor can even be wound up well with a radius of curvature of 5 cm.

The use of a web-shaped superconductor according to the invention for superconductive coils affords numerous advantages over superconductive individual conductors. By means of the sandwich-like construction of the web-shaped superconductor according to my invention, the electrical stability of the coil is essentially improved. The current-carrying ability of the individual conductor in the sandwich is consequently considerably greater than that of the individual conductors that are not held together in the form of a sandwich in an otherwise similar magnetic coils. Due to the large superconductive cross section and the great current-carrying ability in the sandwich, less winding layers than when using web-shaped individual conductors are required in order to achieve the same strong magnetic field. The required labor for winding and the expenditure of material are therefore considerably reduced. Moreover, the greater superconductive cross section of the superconductor constructed in accordance with my invention permits higher current intensities. This is of great interest especially in connection with the so-called superconductive flow pumps or generators. With a web-shaped superconductor according to my invention formed of a superconductive alloy, a greater amount of cold working and therewith a higher current density is attainable, furthermore, for a large superconductive cross section. Advantages are likewise associated with the use of a web-shaped superconductor according to my invention for winding superconductive coils instead of the heretofore conventional cables consisting of twisted superconductor wires. Because the superconductive webs, due to their flat surfaces when wound, lie better upon one another than do the superconductive cables, so that the empty wedge-shaped spaces located between the adjacent cables are eliminated, the packing factors of the coils can be considerably improved due to the use of the superconductive webs constructed in accordance with my invention. Moreover, due to the rectangular cross section of the webs of my invention, the ratio of the cooled surface to the superconductive volume is more favorable than with the cables consisting of wires having round cross section. The webs possess a large heat-contact surface with the coolant flowing through the coil or with the cooling foils inserted between the individual winding layers of the coil. Furthermore, the web-shaped superconductor of my invention affords the possibility for the first time of using webs with niobium-tin layers for coils of good electrical stability.

I claim:

1. Web-shaped superconductor comprising a plurality of hard web-shaped superconductive individual conductors, a coating of metal having relatively good normal electrical and heat conductivity surrounding said individual conductors, respectively, said metal-coated individual conductors being mutually superimposed so that the coatings of mutually adjacent individual conductors are in relatively good electrical and heat transfer contact with one another, said metal coatings of said individual conductors, at least at the mutually adjacent contact surfaces thereof, being provided with a thin layer of a relatively good heat-conductive and, during operation of the superconductor, a relatively good electrically normal-conductive metal of high purity and low melting point, said individual conductors being soldered to one another by means of said thin layers of metal having a low melting point.

2. Web-shaped superconductor comprising a plurality of hard web-shaped superconductive individual conductors, a coating of metal having relatively good normal electrical and heat conductivity surrounding said individual conductors, respectively, said metal-coated individual conductors being mutually superimposed so that the coatings of mutually adjacent individual conductors are in relatively good electrical and heat transfer contact with one another, said metal coatings of said individual conductors, at least at the mutually adjacent contact surfaces thereof, being provided with a thin layer of a relatively good heat-conductive and, during operation of the superconductor, a relatively good electrically normal-conductive metal of high purity and low melting point, said thin metal layer consisting of indium.

3. Web-shaped superconductor according to claim 2 wherein said indium layer has a purity of at least 99.999 percent by weight.

4. Web-shaped superconductor comprising a plurality of hard web-shaped superconductive individual conductors, a coating of metal having relatively good normal electrical and heat conductivity surrounding said individual conductors, respectively, said metal-coated individual conductors being mutually superimposed so that the coatings of mutually adjacent individual conductors are in relatively good electrical and heat transfer contact with one another, and including a common casing surrounding said superimposed individual conductors, said casing consisting of metal having a relatively good electrical normal conductivity during operation of said superconductor and a relatively good heat conductivity.

5. Web-shaped superconductor according to claim 4 wherein said casing is formed of metal selected from the group consisting of copper, silver, gold and aluminum.

References Cited

UNITED STATES PATENTS

| | | | |
|---|---|---|---|
| 3,233,154 | 2/1966 | Hnilicka | 335—216 |
| 3,309,179 | 3/1967 | Fairbanks | 29—199 |
| 3,336,549 | 8/1967 | Kafka | 335—216 |

LEWIS H. MYERS, *Primary Examiner.*

E. A. GOLDBERG, *Assistant Examiner.*

U.S. Cl. X.R.

29—197, 199; 174—126, 133, 117; 335—216

U.S. DEPARTMENT OF COMMERCE
PATENT OFFICE
Washington, D.C. 20231

UNITED STATES PATENT OFFICE

CERTIFICATE OF CORRECTION

Patent No. 3,440,336 April 22, 1969

Gunther Bogner

It is certified that error appears in the above identified patent and that said Letters Patent are hereby corrected as shown below:

In the heading to the printed specification, line 6, "October 16, 1966" should read -- October 16, 1965 --.

Signed and sealed this 21st day of April 1970.

(SEAL)
Attest:

Edward M. Fletcher, Jr.
Attesting Officer

WILLIAM E. SCHUYLER, JR.
Commissioner of Patents